United States Patent
Sato

(10) Patent No.: US 9,643,674 B1
(45) Date of Patent: May 9, 2017

(54) MOTORCYCLE

(71) Applicant: HONDA MOTOR CO., LTD., Tokyo (JP)

(72) Inventor: Yasuhiro Sato, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/960,020

(22) Filed: Dec. 4, 2015

(51) Int. Cl.
| | |
|---|---|
| B62J 6/02 | (2006.01) |
| B60Q 1/20 | (2006.01) |
| B62M 7/02 | (2006.01) |
| B62J 23/00 | (2006.01) |

(52) U.S. Cl.
CPC ...... *B62J 6/02* (2013.01); *B60Q 1/20* (2013.01); *B62J 23/00* (2013.01); *B62M 7/02* (2013.01)

(58) Field of Classification Search
CPC ... B62J 6/02; B62J 23/00; B60Q 1/20; B62M 7/02
USPC .................................................. 362/476, 473
See application file for complete search history.

(56) References Cited

U.S. PATENT DOCUMENTS

| | | | | |
|---|---|---|---|---|
| 4,439,817 A * | 3/1984 | Aton | .................... | F21S 48/1208 362/255 |
| 5,718,210 A * | 2/1998 | Ito | .................... | F02M 25/0809 123/198 D |
| 6,595,666 B1 * | 7/2003 | Exilien | .................... | B60Q 1/18 362/276 |
| 8,550,673 B1 * | 10/2013 | Jones, Jr. | .................. | B60Q 1/12 362/464 |
| 2004/0165396 A1 * | 8/2004 | Hatfield, Jr. | ............... | B62J 6/02 362/473 |
| 2005/0169001 A1 * | 8/2005 | Farrow | .................. | B60Q 1/124 362/476 |
| 2010/0307853 A1 * | 12/2010 | Song | ...................... | B62K 11/00 180/227 |
| 2012/0325571 A1 * | 12/2012 | Nomura | .................. | B60K 6/48 180/220 |
| 2015/0274234 A1 * | 10/2015 | Hara | ........................ | B62J 17/04 296/78.1 |
| 2016/0069304 A1 * | 3/2016 | Guidi | ................. | F02M 25/0809 123/518 |
| 2016/0186699 A1 * | 6/2016 | Fukui | .................. | B60K 15/035 123/520 |
| 2016/0258390 A1 * | 9/2016 | Makino | ............. | F02M 25/0836 |

FOREIGN PATENT DOCUMENTS

JP 2009-234317 A 10/2009

* cited by examiner

*Primary Examiner* — Anne Marie Boehler
*Assistant Examiner* — Marlon A Arce
(74) *Attorney, Agent, or Firm* — Birch, Stewart, Kolasch & Birch, LLP

(57) ABSTRACT

A motorcycle includes a structure for making the lighting devices inconspicuous while still fulfilling the function and protecting the lighting devices. A horizontally opposed engine includes cylinder heads with cylinder head covers covering the cylinder heads. A pair of left and right lighting devices for lighting the front of vehicle are provided. The lighting devices are provided on the cylinder head covers.

19 Claims, 6 Drawing Sheets

MOTORCYCLE

BACKGROUND OF THE INVENTION

1. Field of the Invention

The present invention relates to a motorcycle, in particular, to lighting devices of the motorcycle.

2. Description of Background Art

A motorcycle is known that is provided with an engine guard, which is arranged on the front side of the engine so as to surround the engine. A pair of left and right fog lamps (front fog lights) are mounted on the engine guard. See, for example, Japanese Laid-open Patent Publication No. 2009-234317.

In this way, in the above-mentioned structure the lighting devices are attached to the engine guard so as to be exposed to the outside of the vehicle. Accordingly, there is a problem wherein the lighting devices are conspicuous. In addition, in the structure in which the lighting devices are attached to the engine guard, there is another problem wherein the lighting devices cannot be protected by the engine guard.

SUMMARY AND OBJECTS OF THE INVENTION

The present invention has been achieved in consideration of the above-described circumstances. Accordingly, it is an object of an embodiment of the present invention to provide a motorcycle including the structure which can make the lighting devices inconspicuous and still fulfill its function and protect the lighting devices.

In order to solve the above problem, according to an embodiment of the present invention a motorcycle includes a horizontally opposed engine including cylinder heads and cylinder head covers covering the cylinder heads. A pair of left and right lighting devices are provided for lighting the front of vehicle. The lighting devices are provided on the cylinder head covers.

According to an embodiment of the present invention, the lighting device is provided in a concave portion provided on the cylinder head cover.

According to an embodiment of the present invention, the concave portion is formed in substantially an L-shape so as to be open to be continuous between a front face portion and a side face portion of the cylinder head cover.

According to an embodiment of the present invention, a lens outer surface of the lighting device is formed so as to be flush with an exterior surface of the cylinder head cover.

According to an embodiment of the present invention, an engine guard surrounding the outside of the vehicle of the horizontally opposed engine, and the lighting devices are disposed further inside of the vehicle than the engine guard.

According to an embodiment of the present invention, the cylinder head cover having the lighting device is formed so as to cover a vehicle front portion side of the cylinder head.

According to an embodiment of the present invention, the lighting device is formed in a horizontally long shape so as to extend in the lateral direction of the vehicle at front surface portion of the cylinder head cover.

According to an embodiment of the present invention, the cylinder head cover includes a first cylinder head cover which is fixed via a gasket to the cylinder head; a second cylinder head cover which is disposed on the lower side of the first cylinder head cover; and a third cylinder head cover which is disposed on the outside of the first cylinder head cover and the second cylinder head cover, and the lighting device is provided on the third cylinder head cover.

According to an embodiment of the present invention, since the lighting devices are provided on the cylinder head covers, special members for attaching the lighting devices are not needed. In addition, since the lighting devices are a part of the cylinder head covers, it is possible to make the lighting devices inconspicuous, which thereby can provide the motorcycle which is excellent in external appearance. Further, since the lighting devices are provided on the cylinder head covers which protrude to the left and right sides of the vehicle, the lighting devices can be disposed at the desirable position.

According to an embodiment of the present invention, since the lighting device is provided on the concave portion provided on the cylinder head cover, it enables the structure in which the lighting device is buried in the cylinder head cover, and to provide the lighting device as a part of the design of the cylinder head cover. Accordingly, the lighting device is inconspicuous, which thereby can enhance the external appearance of the motorcycle.

According to an embodiment of the present invention, since the lighting device is disposed in the concave portion in substantially L-shape which is open to be continuous between the front surface side and the side surface side of the cylinder head cover, it is possible to make the opening portion larger and to facilitate the attaching and maintenance operations of lighting source of the lamp and the like.

According to an embodiment of the present invention, since the lens outer surface of the lighting device is formed so as to be flush with an exterior surface of the cylinder head cover, the lighting device can be provided as a part of the design of the cylinder head cover. Therefore, the lighting device is inconspicuous, which thereby can provide the motorcycle which is excellent in the external appearance.

According to an embodiment of the present invention, the engine guard, which surrounds the left and right sides of the horizontally opposed engine, is provided and the lighting devices are disposed further inside of the vehicle than the engine guard. Consequently, it is possible to provide the motorcycle which can protect the lighting devices with the engine guard.

According to an embodiment of the present invention, since the cylinder head cover having the lighting device is formed so as to cover the vehicle front portion side of the cylinder head, it is possible to expand the disposition space of the light source to the extent of the front surface side of the cylinder head, and to provide the motorcycle in which the lighting device is not conspicuous even if the lighting device is enlarged.

According to an embodiment of the present invention, the lighting device is formed in a horizontally long shape so as to extend in the lateral direction of the vehicle on the vehicle front portion side of the cylinder head cover. Accordingly, the lighting device can be provided as a part of the design of the cylinder head cover, and it is possible to provide the motorcycle in which the lighting device is inconspicuous.

According to an embodiment of the present invention, the cylinder head cover has the first cylinder head cover which is fixed via the gasket to the cylinder head; the second cylinder head cover which is disposed on the lower side of the first cylinder head cover; the third cylinder head cover which has the portion covering the outer sides of the first cylinder head cover and the second cylinder head cover, and is configured such that the lighting device is provided on the third cylinder head cover. Accordingly, the lighting device can be formed inconspicuous as a part of the design of the third cylinder head cover. In addition, since the cylinder head cover is formed as a divided structure, it is possible to provide the motorcycle which is excellent in building-in performance and maintainability of the lighting device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
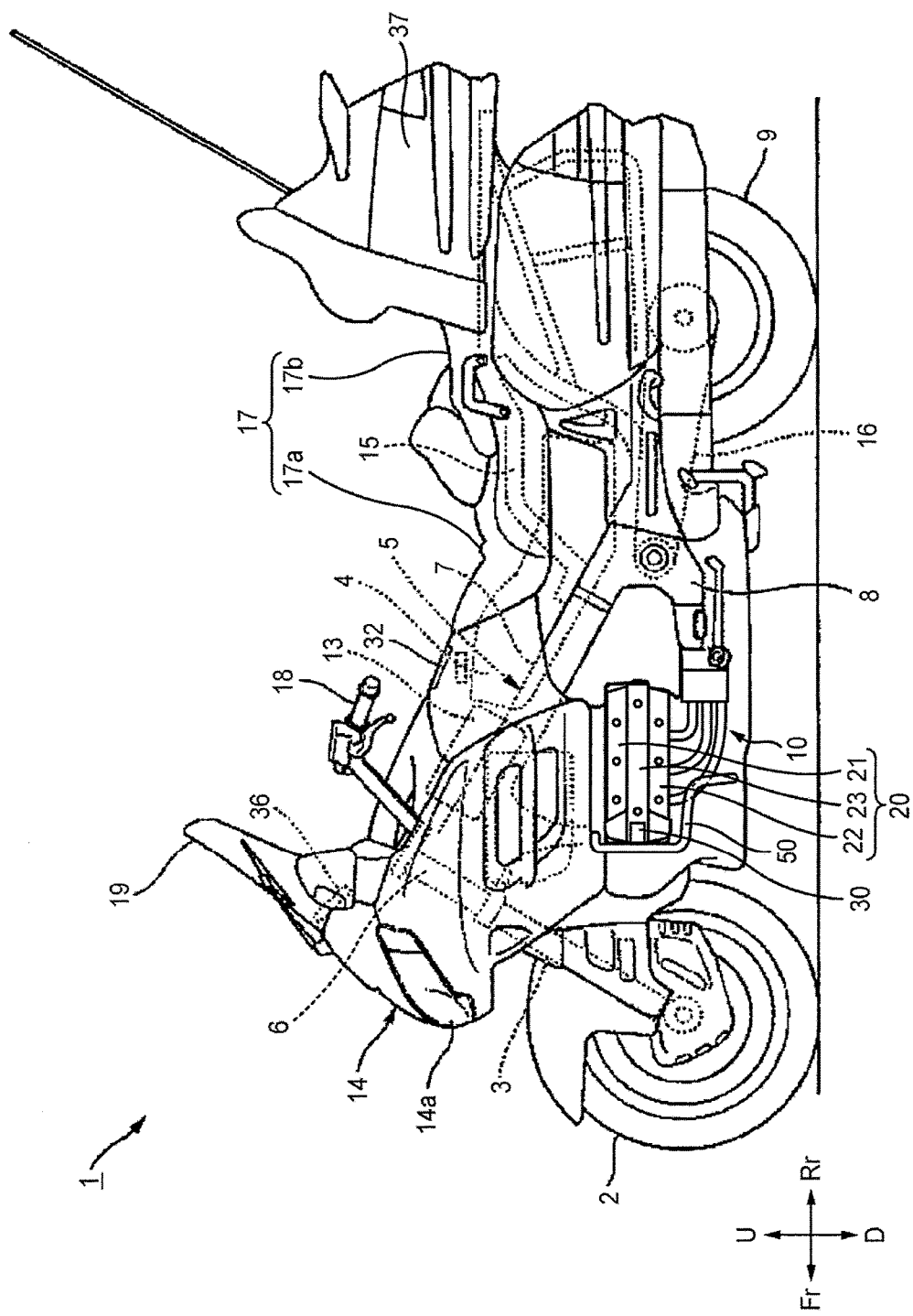
FIG. 1 is a left side view of a motorcycle according to the embodiment of the present invention.

Hereinafter, a motorcycle 1 of an embodiment of the present invention will be specifically described with reference to FIGS. 1 to 6. In the drawings, Fr, Rr, U, D, R, L show the front, rear, upper, lower, right and left directions of the vehicle in the embodiment of the present invention, respectively.

As shown in FIG. 1, the motorcycle 1 of the embodiment of the present invention has a body frame 5 including a head pipe 6, which is provided on the front portion of the vehicle, a main frame 7, which extends rearwardly and downwardly from the head pipe 6, and a rear frame 15, which extends rearwardly and upwardly of the vehicle from the rear end of the main frame 7. In addition, the outside of the body frame 5 is appropriately covered with cover members such as a front cowl 14 and a top shelter 32. Further, the front cowl 14 is provided with a pair of left and right headlamps 14a, 14a, and the upper portion of the front cowl 14 is provided with a wind screen 19.

In addition, the motorcycle 1 has a front fork 3, which is rotatably attached to the head pipe 6, a handle 18, which is attached to the upper end portion of the front fork 3, a front wheel 2, which is rotatably attached to the lower end portion of the front fork 3, a rear wheel 9, which is rotatably attached to a swing arm 16 attached in a vertically swingable manner to a pivot plate 8, and a horizontally opposed engine 10 which is disposed on the lower side of the main frame 7.

Figure 2:
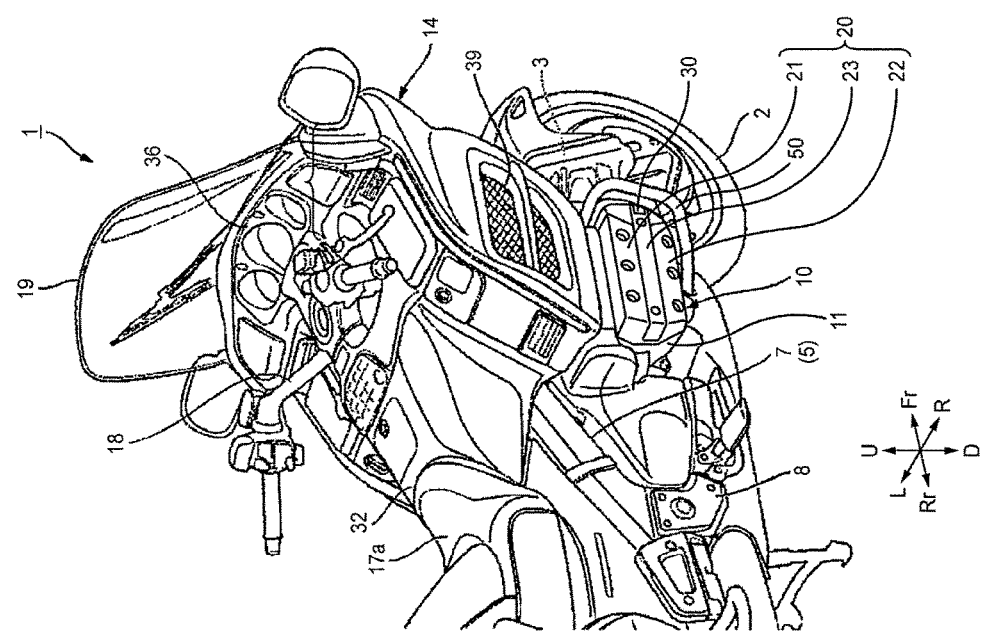
FIG. 2 is a perspective view of the front on the right side surface of the motorcycle shown in FIG. 1.

In addition, as shown in FIG. 2, in front of the handle 18, there is provided a meter panel 36 inside the wind screen 19. Moreover, an air cleaner box 13 and a fuel tank 4 are provided behind the handle 18. Further, a radiator 39 is provided next to the air cleaner box 13. Furthermore, on the upper side of the fuel tank 4, there is provided a riding seat 17 consisting of a front seat 17a and a rear seat 17b. In addition, a rear storage case 37 is provided behind the rear seat 17b.

Figure 3:
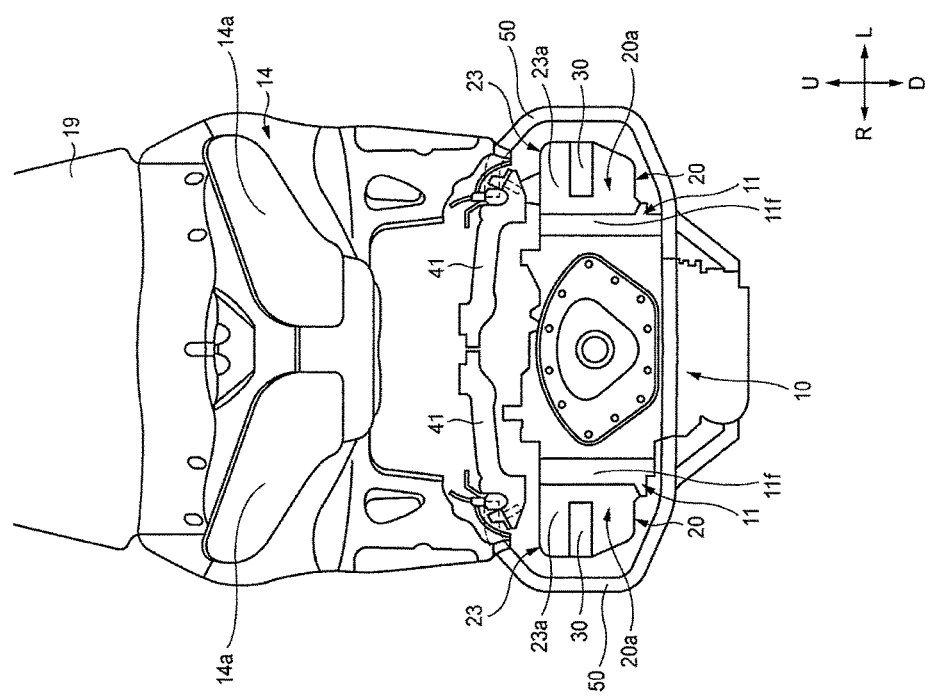
FIG. 3 is a schematic front view of the engine portion and the vehicle body seen from the front side excluding a front wheel portion of the motorcycle shown in FIG. 1.
Figure 4:
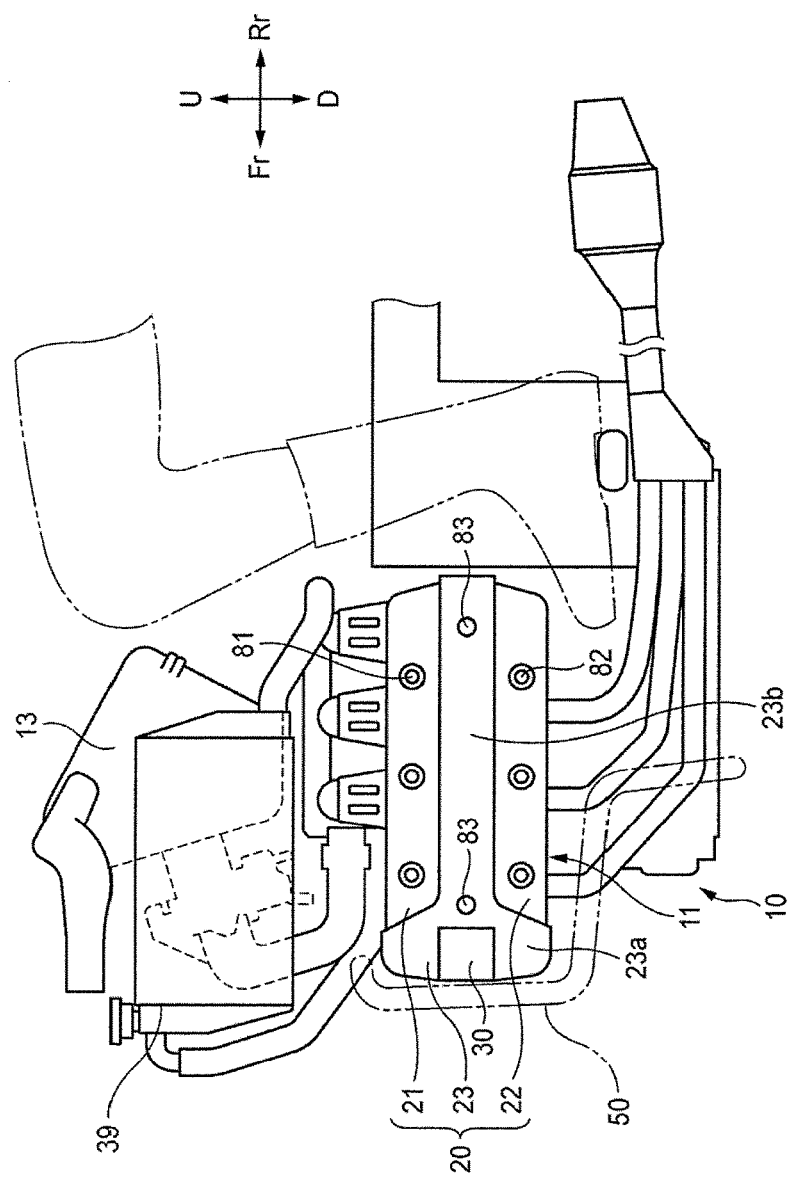
FIG. 4 is a schematic side view showing the engine portion and its peripheral of the motorcycle shown in FIG. 1.

In the embodiment of the present invention, as shown in FIG. 3, the engine is the horizontally opposed engine 10 as mentioned above that includes cylinder heads 11, 11 which protrude to the left and right sides of the vehicle. The cylinder heads 11, 11 are covered with cylinder head covers 20, 20, respectively. In addition, on front face portions 20a of the left and right cylinder head covers 20, 20, there are provided fog lamps 30, 30 that are a pair of left and right lighting devices for lighting the front of the vehicle. The fog lamps 30, 30 are formed, for example, as shown in FIG. 3, in a horizontally elongated shape in a front view. In addition, the pair of left and right fog lamps 30, 30 extend so as to go around from the front face portion 20a to a side face portion 20b (see FIG. 6). Further, the fog lamps 30 are provided so as be buried in the cylinder head covers 20, as described later.

According to the embodiment of the present invention, the cylinder head cover 20 is a divided structure, roughly classified into three parts. More specifically, as shown in FIG. 5, the cylinder head cover includes a first cylinder head cover 21, which is fixed via a gasket 11g to the cylinder head 11, a second cylinder head cover 22, which is disposed on the lower side of the first cylinder head cover 21, and a third cylinder head cover 23, which has the portion covering the outer sides of the first cylinder head cover 21 and the second cylinder head cover 22.

Figure 5:
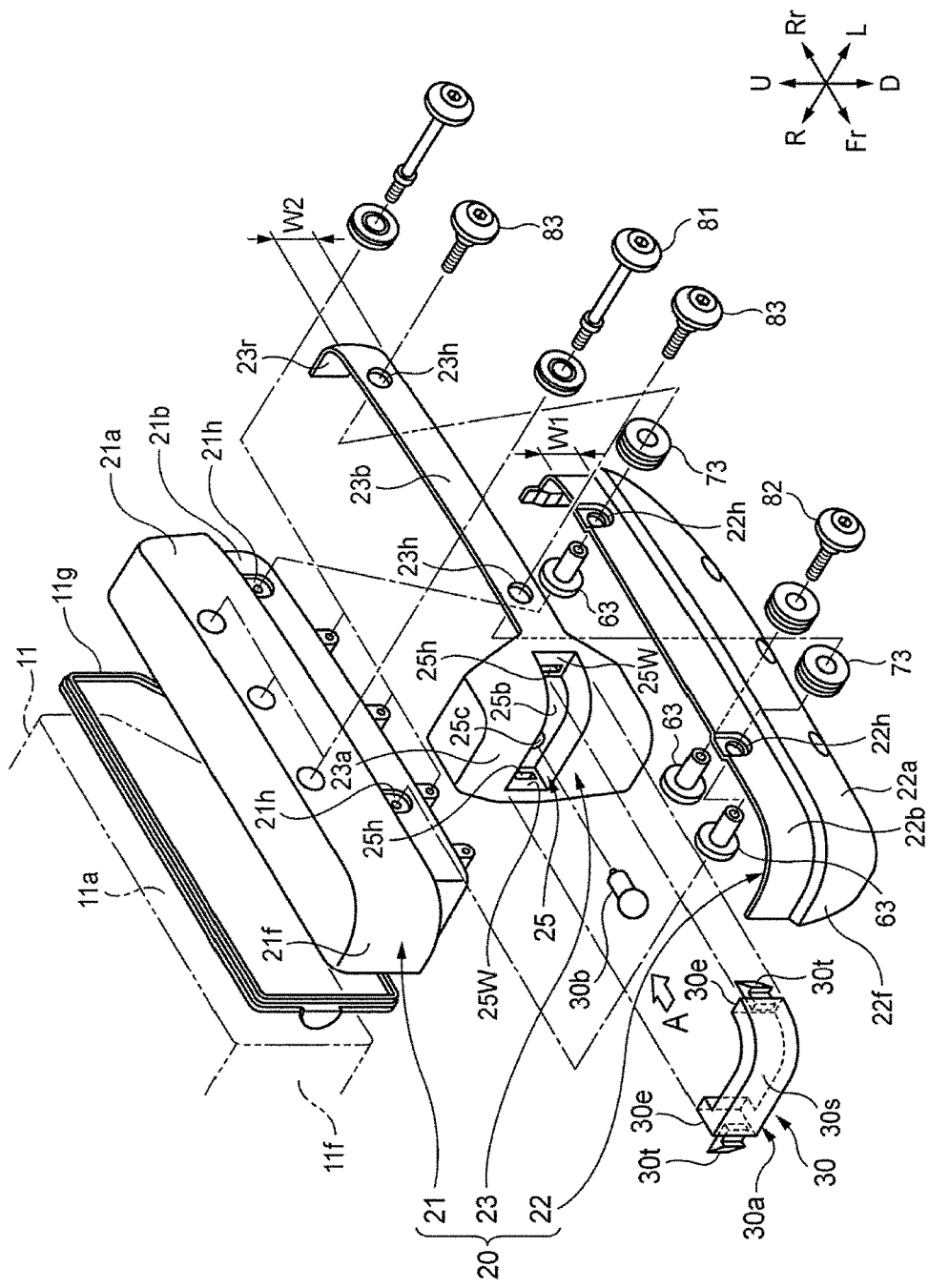
FIG. 5 is an exploded perspective view of a cylinder head cover of the motorcycle shown in FIG. 1.

The first cylinder head cover 21 is the member which substantially covers so as to tightly seal a valve mechanism portion 11a of the cylinder head 11, and is formed in a shape long in the front-and-rear direction of the vehicle as shown in FIG. 5. In addition, the outer surface of the first cylinder head cover 21 is, as shown in FIG. 5, a vertically two-step structure having a first lower portion 21b which is further concaved inside of the vehicle than a first upper portion 21a.

The outer surface structure of the second cylinder head cover 22, which is attached to the lower side of the first cylinder head cover 21, is a two-step structure having a second upper portion 22b which is further concaved inside than a second lower portion 22a. In addition, the second cylinder head cover 22 is mounted such that the second upper portion 22b overlaps the first lower portion 21b of the first cylinder head cover 21. In addition, a width W1 of the second upper portion 22b is formed so as to correspond to the third cylinder head cover 23 which is described later.

The third cylinder head cover 23 has a front portion covering portion 23a, which covers a first cover front surface portion 21f of the first cylinder head cover 21 and a second cover front surface portion 22f of the second cylinder head cover 22, and a rear portion covering portion 23b, which extends rearwardly of the vehicle from the rear end side of the front portion covering portion 23a. In this way, the front portion covering portion 23a, which forms the front face portion 20a of the cylinder head cover 20, substantially extends further to a vehicle front portion side 11f of the cylinder head 11.

The rear portion covering portion 23b is formed with a narrower width W2 than that of the front portion covering portion 23a, and a rear end portion 23r of the rear portion covering portion is formed so as to be curved to the inside of the vehicle. The width W2 of the rear portion covering portion 23b is formed so as to be substantially the same as the width W1 of the second upper portion 22b of the second cylinder head cover 22.

In addition, on the front portion covering portion 23a, there is formed a concave portion 25 that is open so as to be continuous between the front face portion 20a and the side face portion 20b of the cylinder head cover 20. More specifically, the concave portion 25 is formed in substantially L-shape in a plan view. Then, the fog lamp 30 is provided so as to be fitted into the concave portion 25. In addition, the fog lamp 30 has, for example, a lens 30a in substantially L-shape in a plan view and a light source 30b.

According to the embodiment of the present invention, when the cylinder head cover 20 is mounted, first, the first cylinder head cover 21 is disposed so as to overlap the cylinder head 11 via the gasket 11g. Further, a part (the upper side) of the second cylinder head cover 22 overlaps the first cylinder head cover. Thereafter, the third cylinder head cover 23 overlaps the second cylinder head cover 22.

In addition, the first cylinder head cover 21 is fixed by mounting screws 81 and the like. In addition, the second cylinder head cover 22 is fixed by mounting screws 82. Moreover, the third cylinder head cover 23 is fixed by two mounting screws 83. The mounting screws 83 fasten the first, second and third cylinder head covers 21, 22, 23 at the same time. More specifically, the mounting screws 83 penetrate third cover insert holes 23h of the third cylinder head cover 23 and second cover insert holes 22h of the second cylinder head cover 22, and are screwed with mounting holes 21h of the first cylinder head cover 21. Further, the mounting screws 83 fix the first, second and third cylinder head covers 21, 22, 23 with each other while interposing spacers 63 between the first cylinder head cover 21 and the second cylinder head cover 22, and spacers 73 between the second cylinder head cover 22 and the third cylinder head cover 23.

According to the embodiment of the present invention, the fog lamp 30 can be bent in substantially an L-shape in a plan view so as to be fit into the shape of the concave portion 25 as shown in FIG. 5. In addition, engagement projections 30t, 30t are projected on left and right end portions 30e, 30e of the lens 30a of the fog lamp 30. On the other hand, engagement holes 25h, 25h are formed on inner wall portions 25w, 25w of the both ends in longitudinal direction of the concave portion. In addition, the engagement projections 30t, 30t and the engagement holes 25h, 25h are formed such that they can be suitably locked with each other when the engagement projections 30t, 30t are pushed into the engagement holes. Accordingly, the fog lamp 30 is mounted in the concave portion 25 by inserting the engagement projections 30t, 30t of the lens 30a in the engagement holes 25h, 25h so as to be pushed into the engagement holes (arrow A direction in FIG. 5). In addition, the light source 30b of the fog lamp 30 is attached to a mounting portion 25c of a bottom surface wall 25b of the concave portion 25.

Figure 6:
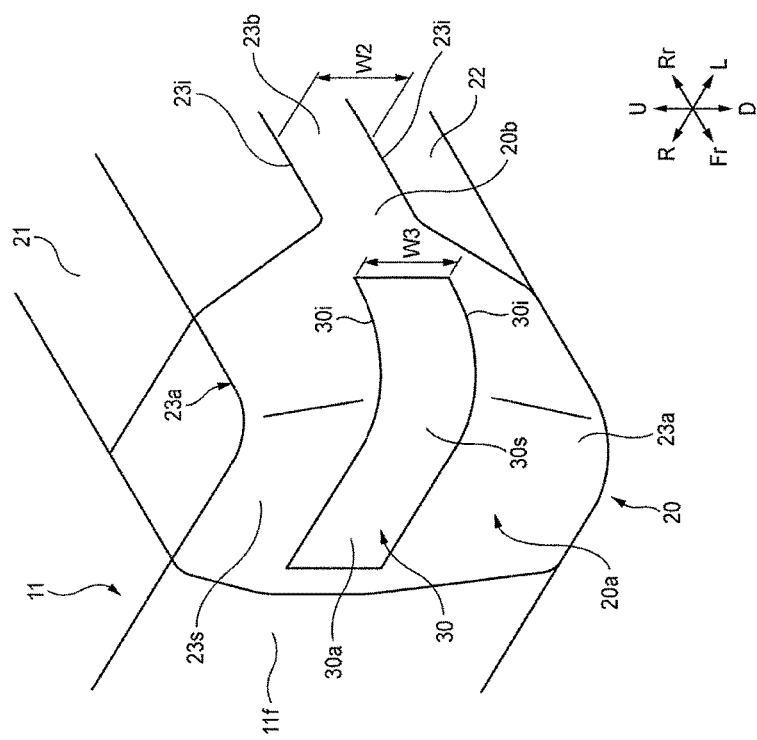
FIG. 6 is an enlarged perspective view showing the lighting device and its peripheral of the motorcycle shown in FIG. 1.

According to the embodiment of the present invention, as shown in FIG. 6, a lens outer surface 30s of the fog lamp 30 is formed so as to be flush with an exterior surface 23s of the cylinder head cover 20.

In addition, as shown in FIGS. 3 and 6, the cylinder head cover 20 includes the front face portion 20a covering the vehicle front portion side 11f of the cylinder head 11, and the outermost exterior surface of the front face portion 20a is formed on the front portion covering portion 23a of the third cylinder head cover 23. Then, the fog lamp 30 is formed in a horizontally long shape so as to extend in the lateral direction of the vehicle at the front portion covering portion 23a.

In addition, according to the embodiment of the present invention, as shown in FIGS. 2 and 3, there is provided an engine guard 50 surrounding the lower side and the left and right sides of the horizontally opposed engine 10. The fog lamps 30, which are disposed on the front portion covering portions 23a of the cylinder head covers 20, are disposed further inside of the vehicle than the engine guard 50.

As described above, according to the motorcycle 1 of the embodiment of the present invention, since the fog lamp 30 is provided on the cylinder head cover 20, it enables the structure in which special members for attaching the fog lamp 30 is not needed. In addition, the fog lamp 30 is formed so as to be a part of the cylinder head cover 20. As a result, the fog lamp 30 is inconspicuous.

Further, since the fog lamp 30 is provided on the front face portion 20a and the side face portion 20b of the cylinder head cover 20 which protrude to the left and right sides of the vehicle, the fog lamp 30 can be disposed at such a desirable position as to protrude to the left and right sides of the vehicle.

According to the motorcycle 1 of the embodiment of the present invention, since the fog lamp 30 is disposed on the concave portion 25 provided on the third cylinder head cover 23 of the cylinder head cover 20, it enables the structure in which the fog lamp 30 is buried in the cylinder head cover. Accordingly, the fog lamp can be provided as a part of the design of the cylinder head cover 20, which allows the fog lamp 30 itself to have an inconspicuous structure. As a result, the fog lamp 30 is inconspicuous, which thereby can enhance the external appearance of the motorcycle 1.

According to the motorcycle 1 of the embodiment of the present invention, since the fog lamp is disposed in the concave portion in substantially L-shape which is open to be continuous between the front face portion 20a and the side face portion 20b of the cylinder head cover 20, it is possible to make the opening portion larger. As a result, it is possible to facilitate the attaching and maintenance operations of the light source 30b, the lens 30a and the like of the fog lamp 30.

According to the motorcycle 1 of the embodiment of the present invention, the cylinder head cover 20 is formed as a divided structure having the first cylinder head cover 21; the second cylinder head cover 22 is disposed on the lower side of the first cylinder head cover 21; the third cylinder head cover 23 has the portion covering the outside of the first cylinder head cover 21 and the second cylinder head cover 22, it is possible to facilitate the attaching and maintenance operations of the fog lamp 30. Further, since the cylinder head cover is configured such that the fog lamp 30 is provided on the third cylinder head cover 23, the fog lamp 30 can be formed inconspicuous as a part of the design of the third cylinder head cover 23. Furthermore, the harness of the light source 30b can be wired, for example, by making use of the space between the second cylinder head cover 22 and the third cylinder head cover 23 made by the spacers 73. In this configuration, the light source 30b can be easily provided without exposing the harness of the fog lamp 30 to the outside of the vehicle.

According to the motorcycle 1 of the embodiment of the present invention, since the lens outer surface 30s of the fog lamp 30 is formed so as to be flush with the exterior surface 23s of the cylinder head cover 20, the fog lamp 30 can be provided so as to be inconspicuous as a part of the design of the cylinder head cover 20. Therefore, the fog lamp 30 is inconspicuous, which thereby can improve the external appearance of the motorcycle 1.

According to the motorcycle 1 of the embodiment of the present invention, since the fog lamp 30 is formed in a horizontally long shape so as to extend in the lateral direction of the vehicle on the vehicle front portion side of the cylinder head cover, the fog lamp 30 can be provided as a part of the design of the cylinder head cover 20. Also in this configuration, the fog lamp 30 is inconspicuous. In particular, according to the embodiment of the present invention, for example, when a width W3 in the vertical direction of the fog lamp 30 is formed to be substantially the same as the width W2 of the rear portion covering portion 23b, a horizontal line 30i of the fog lamp 30 and a horizontal line 23i of the rear portion covering portion 23b form substantially the same line segment. Accordingly, it allows the fog lamp 30 to have more inconspicuous structure.

In the motorcycle 1 of the embodiment of the present invention, since the cylinder head cover 20 having the fog lamp 30 is formed large enough to cover the first cover front surface portion 21f of the cylinder head 11, it is possible to expand the disposition space of the fog lamp 30 to the extent of the front portion covering portion 23a of the cylinder head 11, and to enlarge the fog lamp 30.

According to the motorcycle 1 of the embodiment of the present invention, the engine guard 50, which surrounds the lower side and the left and right sides of the horizontally opposed engine 10, is provided and the fog lamps 30 are disposed further inside of the vehicle than the engine guard 50. Consequently, it is possible to protect the fog lamps 30 with the engine guard 50.

Having thus described the specific embodiment of the present invention, the present invention is not limited to the above-described preferred embodiment, and various changes in design may be made.

For example, the cylinder head cover 20 of the above-mentioned embodiment is configured such that the first cylinder head cover 21, the second cylinder head cover 22 and the third cylinder head cover 23 are fixed with the mounting screws 81, 82, 83 and the like, but not always limited to the embodiment, the cylinder head cover may be configured together with hook structure and the like.

The cylinder head cover 20 of the above-mentioned embodiment is a three division structure, but the cylinder head cover is not limited to the embodiment.

Moreover, in the above-mentioned embodiment, the shape of the fog lamp 30 is a horizontally long rectangle, but not limited to such a shape, and the shape of the fog lamp may be varied such as circular and vertically long.

Further, the mounting structure of the lens 30a of the fog lamp 30 of the above-mentioned embodiment is the detachable structure such that the engagement projections 30t, 30t are pushed into the engagement holes 25h, 25h, but not limited to such structure, and may be suitably changed such as applying the screw fastening structure.

Furthermore, the lens 30a and the light source 30b of the fog lamp 30 of the above-mentioned embodiment are formed as separate members, but not limited to such mode, and may be, for example, such a structure that the lens portion and the light source are integrally formed.

In addition, in the above-mentioned embodiment, the fog lamp 30 is described as the lighting device, but the lighting device is not limited to the fog lamp.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a motorcycle comprising:
a horizontally opposed engine including cylinder heads, each cylinder head having a front facing surface, an upper facing surface, a rear facing surface, a downwardly facing surface and a laterally facing surface;
cylinder head covers for covering said cylinder heads, each cylinder head cover having a front facing surface and a laterally facing surface covering the laterally facing surface of the cylinder head; and
a pair of left and right lighting devices for lighting a front of the motorcycle;
wherein said lighting devices are provided on said cylinder head covers.

2. The motorcycle according to claim 1, wherein said lighting device is provided in a concave portion provided on said cylinder head cover.

3. The motorcycle according to claim 2, wherein said concave portion is formed in a substantially L-shape so as to be open to be continuous between a front face portion and a side face portion of said cylinder head cover.

4. The motorcycle according to claim 1, wherein a lens outer surface of said lighting device is formed so as to be flush with an exterior surface of said cylinder head cover.

5. The motorcycle according to claim 2, wherein a lens outer surface of said lighting device is formed so as to be flush with an exterior surface of said cylinder head cover.

6. The motorcycle according to claim 3, wherein a lens outer surface of said lighting device is formed so as to be flush with an exterior surface of said cylinder head cover.

7. The motorcycle according to claim 2, and further including an engine guard surrounding an outside of the motorcycle of said horizontally opposed engine, and said lighting devices are disposed further inside of the motorcycle than said engine guard.

8. The motorcycle according to claim 1, and further including an engine guard surrounding an outside of the motorcycle of said horizontally opposed engine, and said lighting devices are disposed further inside of the motorcycle than said engine guard.

9. The motorcycle according to claim 4, and further including an engine guard surrounding an outside of the motorcycle of said horizontally opposed engine, and said lighting devices are disposed further inside of the motorcycle than said engine guard.

10. The motorcycle according to claim 1, wherein said cylinder head cover having said lighting device is formed so as to cover the motorcycle front portion side of said cylinder head.

11. The motorcycle according to claim 2, wherein said cylinder head cover having said lighting device is formed so as to cover the motorcycle front portion side of said cylinder head.

12. The motorcycle according to claim 3, wherein said cylinder head cover having said lighting device is formed so as to cover the motorcycle front portion side of said cylinder head.

13. The motorcycle according to claim 4, wherein said cylinder head cover having said lighting device is formed so as to cover the motorcycle front portion side of said cylinder head.

14. In a motorcycle comprising:
a horizontally opposed engine including cylinder heads;
cylinder head covers for covering said cylinder heads;

a pair of left and right lighting devices for lighting a front of the motorcycle;

wherein said lighting devices are provided on said cylinder head covers; and an engine guard surrounding an outside of the motorcycle of said horizontally opposed engine, wherein the lighting devices are disposed further inside of the motorcycle than said engine guard.

15. The motorcycle according to claim 10, wherein said lighting device is formed in a horizontally long shape so as to extend in the lateral direction of the motorcycle at front surface portion of said cylinder head cover.

16. The motorcycle according to claim 1, wherein said cylinder head cover includes:
   a first cylinder head cover fixed via a gasket to said cylinder head;
   a second cylinder head cover disposed on the lower side of said first cylinder head cover; and
   a third cylinder head cover disposed on the outside of said first cylinder head cover and said second cylinder head cover; and
   said lighting device is provided on said third cylinder head cover.

17. The motorcycle according to claim 2, wherein said cylinder head cover includes:
   a first cylinder head cover fixed via a gasket to said cylinder head;
   a second cylinder head cover disposed on the lower side of said first cylinder head cover; and
   a third cylinder head cover disposed on the outside of said first cylinder head cover and said second cylinder head cover; and
   said lighting device is provided on said third cylinder head cover.

18. Lighting devices for a motorcycle including a horizontally opposed engine with cylinder heads comprising:
   cylinder head covers for covering said cylinder heads;
   a pair of left and right lighting devices for lighting a front of the motorcycle, said lighting devices being provided on said cylinder head covers; and
   a lens outer surface of said lighting device is formed so as to be flush with an exterior surface of said cylinder head cover,
   wherein said lighting device is provided in a concave portion provided on said cylinder head cover and said concave portion is formed in a substantially L-shape so as to be open to be continuous between a front face portion and a side face portion of said cylinder head cover.

19. The motorcycle according to claim 14, wherein said cylinder head cover having said lighting device is formed so as to cover the motorcycle front portion side of said cylinder head.

* * * * *